UNITED STATES PATENT OFFICE.

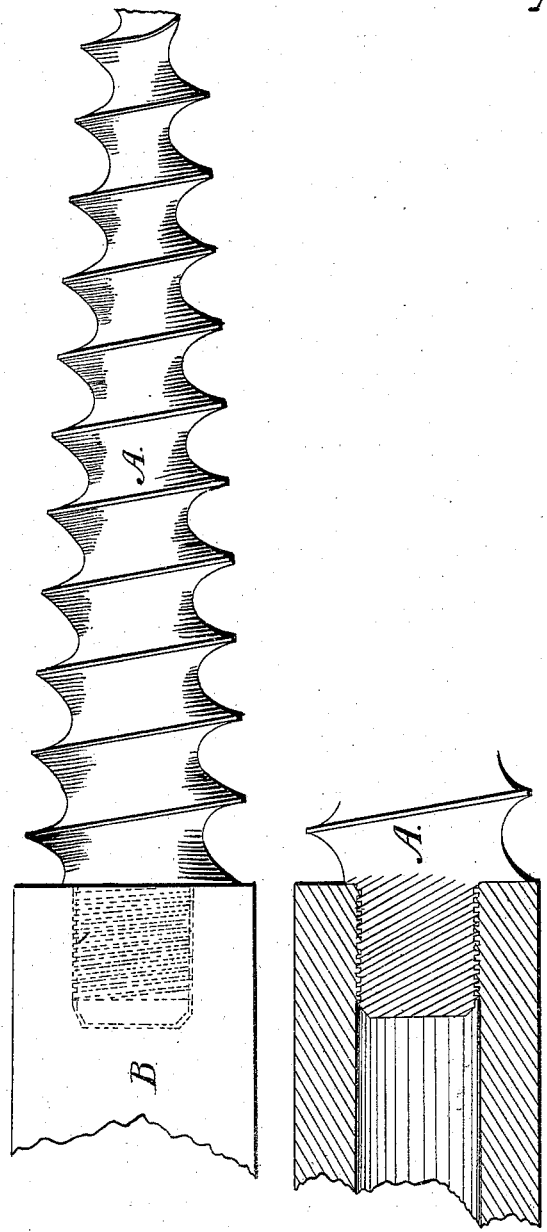

JONATHAN RIDGWAY, OF NEW YORK, N. Y.

MODE OF INSERTING BRANCH PIPES THROUGH THE GROUND WITHOUT EXCAVATING.

Specification of Letters Patent No. 2,722, dated July 16, 1842.

*To all whom it may concern:*

Be it known that I, JONATHAN RIDGWAY, of the city, county, and State of New York, plumber, have invented a new and useful method by which tubes can be inserted through the ground without opening the pavement except at the connection with the main pipe into which it branches, thereby preventing the obstruction, delay, and confusion always attendant on cross-cutting open the street in a business part of the city, and that the following is a full, clear, and exact description thereof, reference being had to the drawing accompanying this specification and making a part of the same.

A is a screw of very coarse, deep thread made somewhat tapering, of sufficient projection to take firm hold of the ground so as to draw after it the pipe B, to which it is attached through the ground when turned around by the said pipe with a common crank handle in the opposite end of the pipe, and which handle or crank can be removed to each succeeding length that may be required to reach the main pipe, when the screw can be detached, leaving the pipe in the ground ready to be connected to the main pipe.

What I claim as my invention is—

The application or connection of a screw to the pipe to be inserted, by which means the pipe is drawn through the ground.

JONATHAN RIDGWAY.

Witnesses:
JON. RIDGWAY, Jur.,
EDMUND NESBITT.